US006364256B1

(12) United States Patent
Neider et al.

(10) Patent No.: US 6,364,256 B1
(45) Date of Patent: Apr. 2, 2002

(54) ROOF TOP PIPE SUPPORT

(75) Inventors: Michael A. Neider, Sandy; Nathan M. Sargent, Coalville, both of UT (US)

(73) Assignee: Miro Industries, Inc., Sandy, UT (US)

( * ) Notice: Subject to any disclaimer, the term of this patent is extended or adjusted under 35 U.S.C. 154(b) by 0 days.

(21) Appl. No.: 09/472,407

(22) Filed: Dec. 27, 1999

(51) Int. Cl.[7] ................................................. F16L 3/16
(52) U.S. Cl. .......................................... 248/55; 248/68.1
(58) Field of Search ............................ 248/55, 65, 68.1, 248/72, 73

(56) References Cited

U.S. PATENT DOCUMENTS

| | | | |
|---|---|---|---|
| 813,588 A | * 2/1906 | Rollins ........................ | 248/55 |
| 827,575 A | 7/1906 | Smead | |
| 1,788,939 A | 1/1931 | Axlund ........................ | 248/55 |
| 1,861,436 A | * 6/1932 | Collins ........................ | 138/113 |
| 2,103,811 A | 12/1937 | Davis ........................... | 248/55 |
| 2,893,669 A | * 7/1959 | Kindorf ........................ | 248/55 |
| 3,769,190 A | * 10/1973 | Deem, Jr. ................... | 204/196.15 |
| 3,791,564 A | * 2/1974 | Hugonin ...................... | 226/19 |
| 4,502,653 A | 3/1985 | Curtis, Jr. .................... | 248/55 |
| 4,513,934 A | 4/1985 | Pruyne ......................... | 248/49 |
| 5,217,191 A | 6/1993 | Smith ........................... | 248/55 |
| 5,685,508 A | 11/1997 | Smith ........................... | 248/55 |
| 5,816,554 A | * 10/1998 | McCracken ............ | 248/346.01 |

* cited by examiner

*Primary Examiner*—Anita King
*Assistant Examiner*—Holly N. Sy
(74) *Attorney, Agent, or Firm*—Mallinckrodt & Mallinckrodt; Robert R. Mallinckrodt

(57) ABSTRACT

A roof top pipe support includes a base having a substantially flat bottom to rest on the roof. At least one, and preferably a pair of raised portions provide a pair of stud-receiving holes in the base to receive and direct studs, preferably threaded studs, upwardly from the base. The raised portion also can receive and support a pipe supporting roller. A pipe support such as a pipe supporting roller or a strut also can extend between upwardly extending studs and be adjustably secured to the studs so the height of the pipe support can be adjusted. Either pipe support can be used depending upon conditions and the height of the support needed.

17 Claims, 5 Drawing Sheets

ROOF TOP PIPE SUPPORT

BACKGROUND OF THE INVENTION

1. Field

Figure 2:
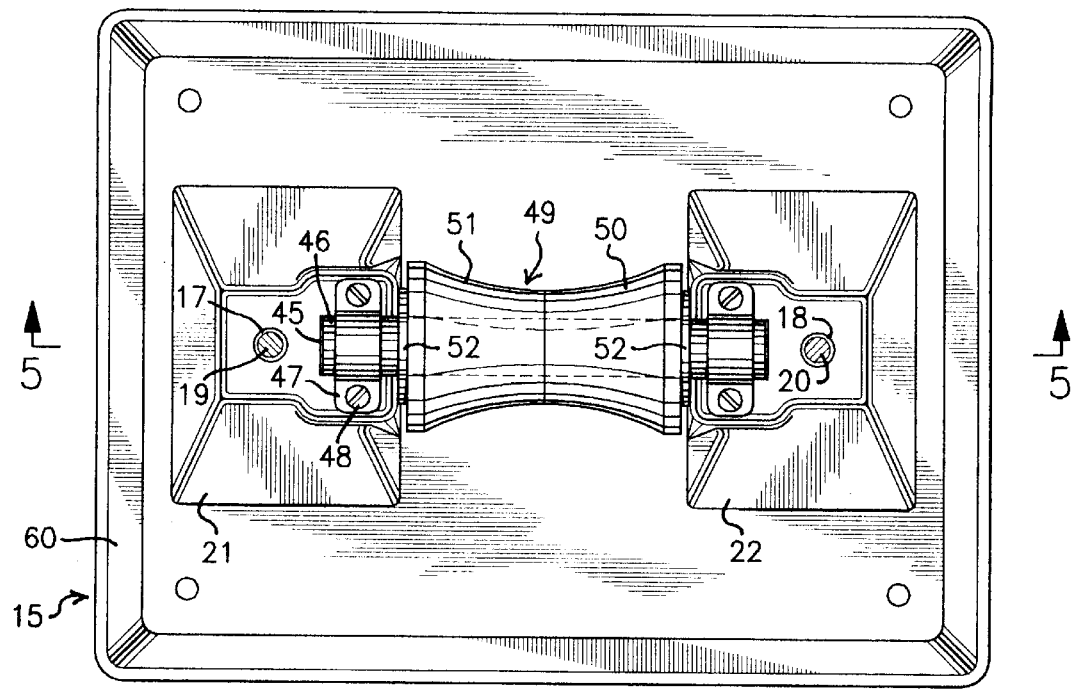

The invention is in the field of supports or hangers for exterior pipes on building roofs.

2. State of the Art

It is very common in commercial buildings for there to be various types of pipes which are exposed and run along the top of the roofs of such buildings. These pipes may be connected to air conditioning units mounted on a building roof or to various other service units.

Historically, it was common practice for these pipes to be supported above the roof surface at intervals along their length by placing blocks of wood between the roof surface and the pipes. With temperature changes, the pipes expand and contract and, partly because of the large contact surface area between a block and the pipe, the block moves with the pipe. After a period time, the movement of the block against the roof with the weight of the pipe thereon causes damage to the roof, which usually results in a leak and requires expensive roof repair. Even where the blocks are nailed down to the roof, the nails and the wood usually deteriorate in a relatively short time period so that the blocks break loose. Further, wood blocks are difficult to seal so the roof usually leaks about these nail holes.

Various pipe holders that sit on a roof to support the pipes have now been developed and are in common use. For example, U.S. Pat. Nos. 4,502,653 and 4,513,934 show pipe-supporting devices which have substantially flat bottomed bases with pipe supporting structure rising from the base that substantially equally distributes the weight of the pipe over the bottom of the base and thus over the area of the roof in contact with the base. The pipe supporting structures have a substantially V recess having divergent line contacts for receiving and supporting the pipe above the base. In this manner, the pipe is supported in the V with two contact points. This provides for easy sliding movement of the pipe within the support as the pipe expands or contracts. The support of the '653 patent includes a plastic roller in the bottom of the V recess.

U.S. Pat. Nos. 5,217,191 and 5,685,508 show heavy bases, generally reinforced concrete, which sit on a foot pad glued to a roof surface and support a pipe on a roller adjustably mounted above the base. While the adjustability of the roller is helpful in equalizing the load of the pipe carried by respective supports or hangers, the heavy reinforced concrete bases are difficult to ship and transport.

SUMMARY OF THE INVENTION

According to the invention, a pipe hanger or support for use on building roofs includes a molded plastic base with a pair of spaced apart molded stud receiving holes which receive threaded studs the rein which extend upwardly from the base to support a roller on a roller shaft or a pipe supporting strut which extends between such studs. Nuts adjustably support the roller shaft or strut on the studs. The molded base also includes spaced apart receiving recesses for receiving ends of a roller shaft nonadjustably therein to support a pipe roller thereon. Thus, the same base can support a pipe with an adjustable height roller, or a nonadjustable height roller as needed for the particular installation.

THE DRAWINGS

Figure 1:
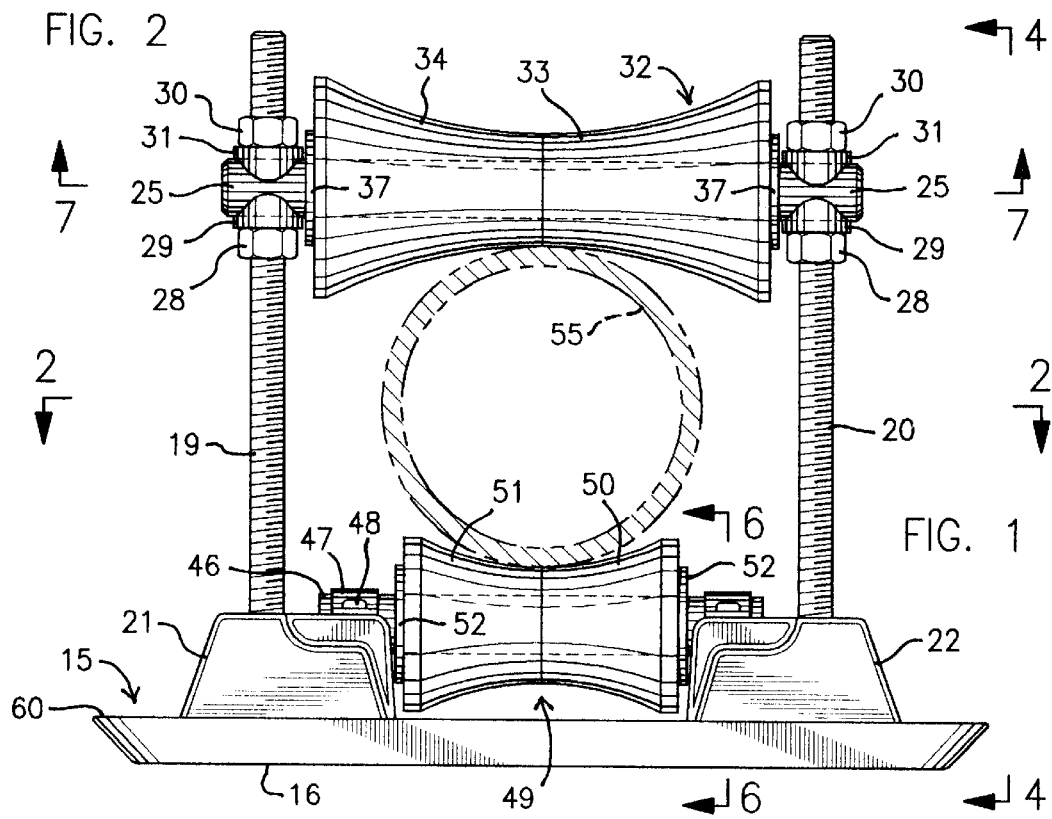
Figure 3:
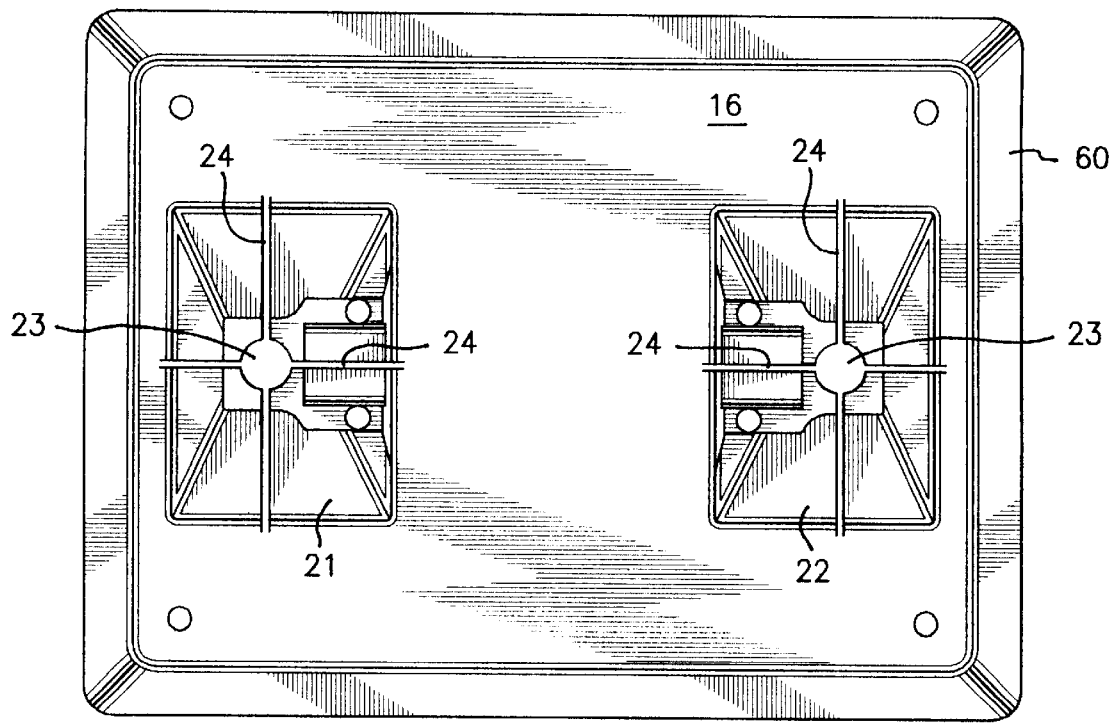
Figure 4:
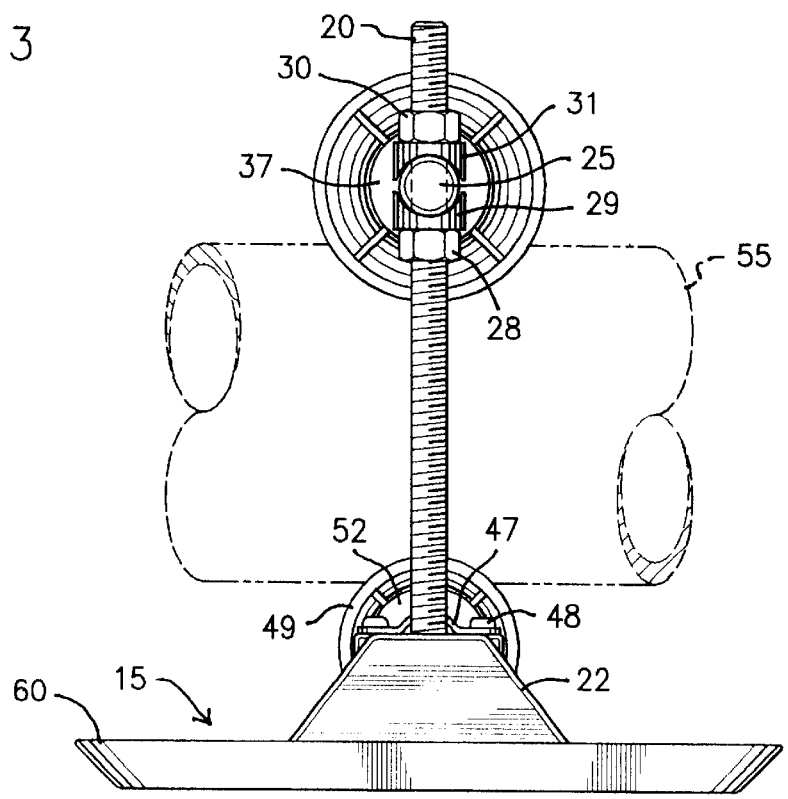
Figure 6:
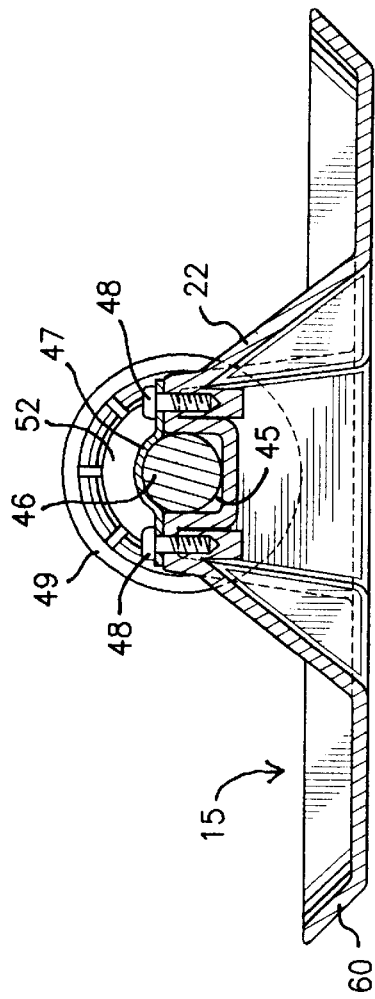
Figure 5:
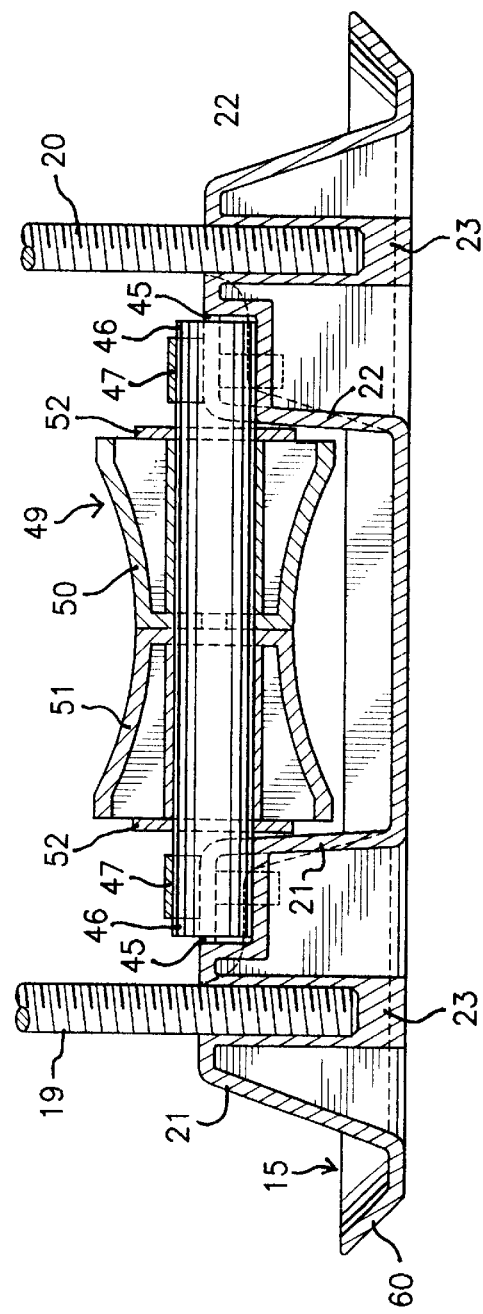
Figure 7:
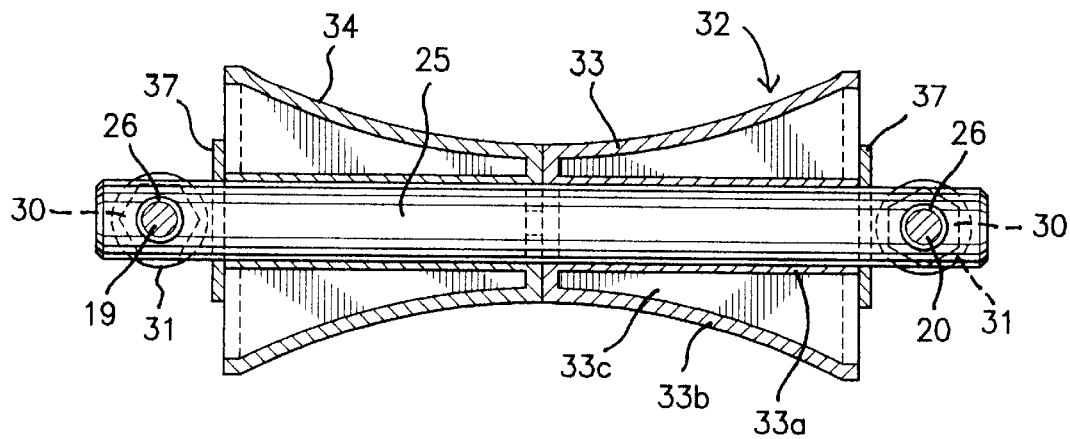
Figures 8, 9:
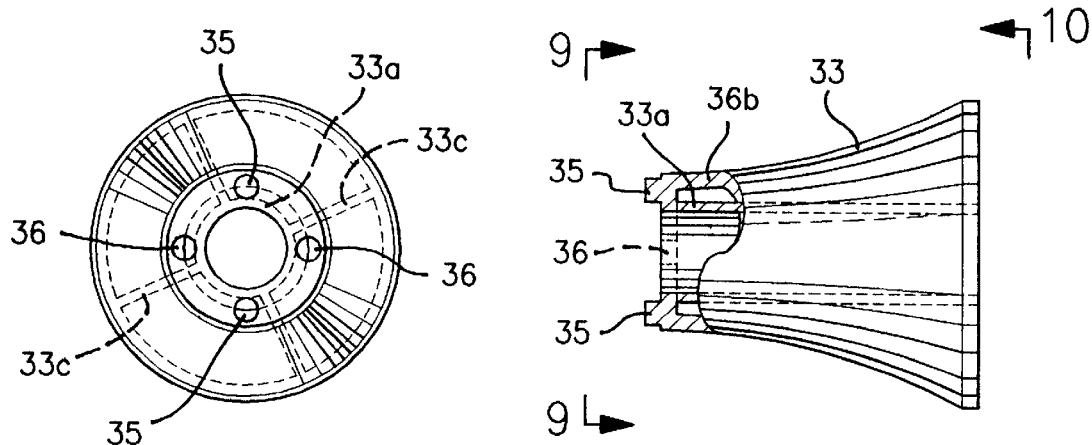
Figure 10:
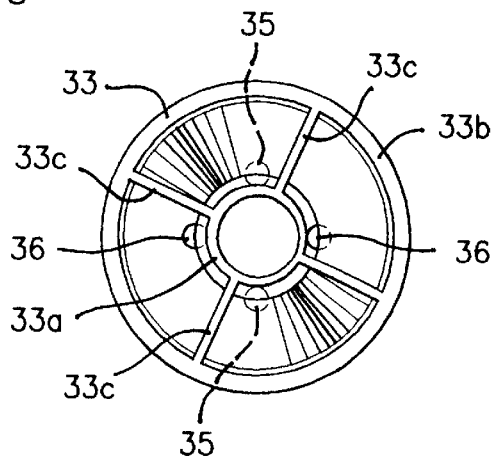
Figure 12:
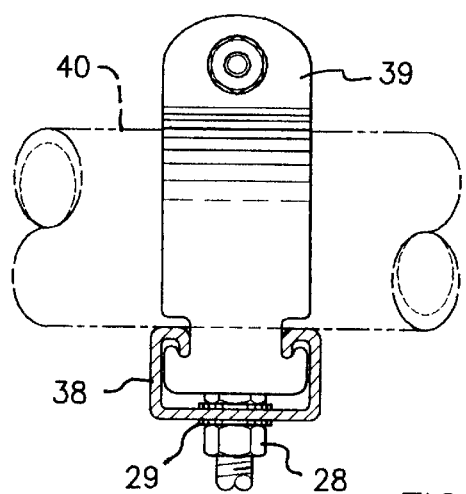
Figure 11:
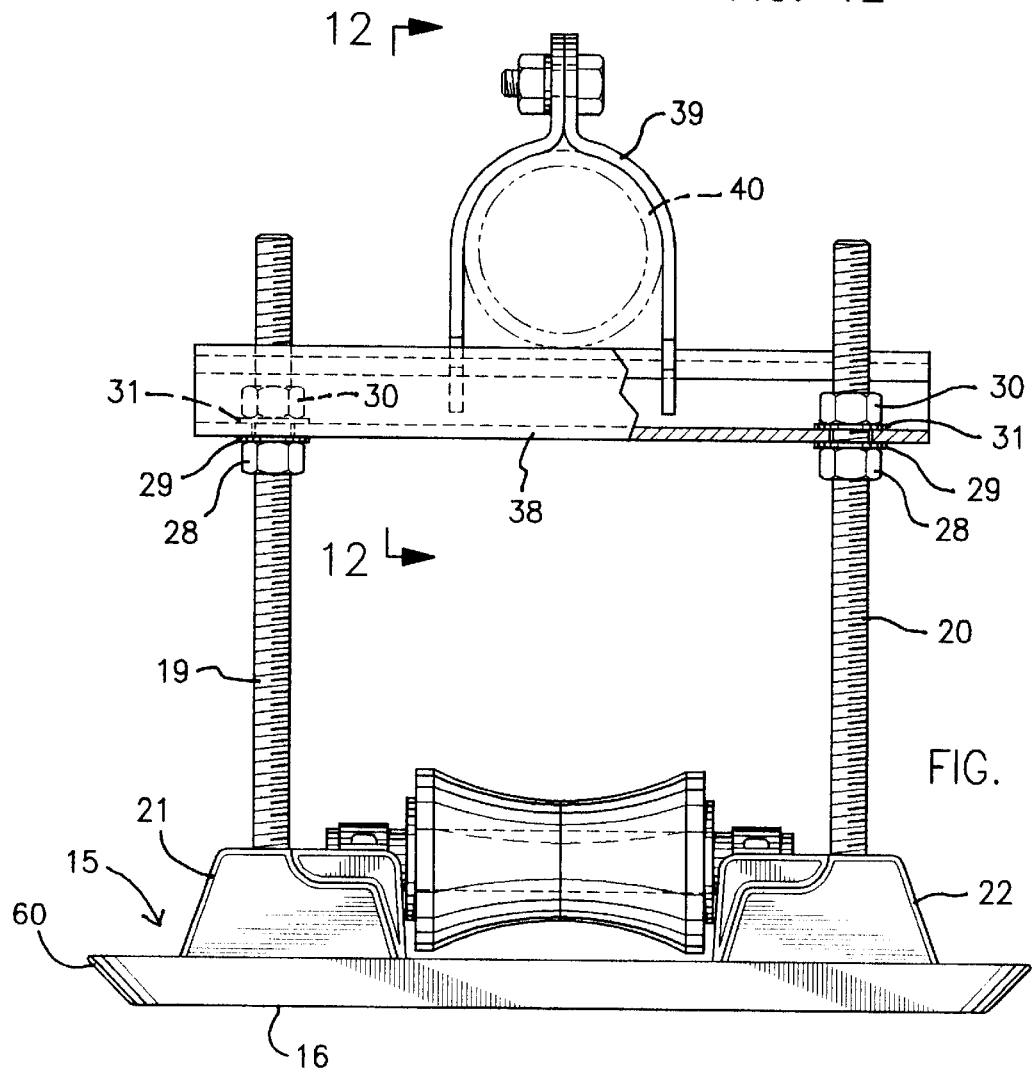

The best mode presently contemplated for carrying out the invention is illustrated in the accompanying drawings, in which:

FIG. 1 is a front elevation of the pipe hanger of the invention showing a pipe in phantom supported on one of the rollers;

FIG. 2, a top plan view of the base taken on the line 2—2 of FIG. 1;

FIG. 3, a bottom plan view thereof;

FIG. 4, a right side elevation of the hanger of FIG. 1 taken on the line 4—4 of FIG. 1;

FIG. 5, a fragmentary vertical section taken on the line 5—5 of FIG. 2;

FIG. 6, a fragmentary vertical section taken on the line 6—6 of FIG. 1;

FIG. 7, a horizontal section through the adjustable roller taken on the line 7—7 of FIG. 1;

FIG. 8, a side elevation, with a portion thereof broken away, of a piece forming half of a roller used with the invention;

FIG. 9, an end elevation of the roller half piece taken on the line 9—9 of FIG. 8;

FIG. 10, an end elevation of the roller half piece taken on the line 10—10 of FIG. 8;

FIG. 11, a view similar to that of FIG. 1, but showing an alternate pipe supporting means; and FIG. 12, a fragmentary vertical section taken on the line 12—12 of FIG. 11.

DETAILED DESCRIPTION OF THE ILLUSTRATED EMBODIMENT

The pipe support or pipe hanger of the invention includes a molded plastic base 15 having a substantially flat bottom 16 of dimensions large enough to spread the weight of any pipe supported by the hanger over a portion of a building roof sufficient to safely support such weight without damage to the roof. A bottom surface of about nine inches by six inches has been found satisfactory for most roofs and most pipes to support weights up to about one hundred and fifty pounds, although such dimensions may vary substantially, and dimensions can vary depending upon the expected weight to be supported. Further, a substantially flat bottom does not mean that the bottom does not contain recesses or other openings therein, but merely that at least a portion of the base has a flat surface that rests on the roof. The base is configured to include a pair of stud mounting holes 17 and 18 to receive studs 19 and 20, respectively, therein. The studs preferably take the form of threaded rods that can be screwed into the respective receiving holes to extend upwardly from the base in spaced apart, parallel configuration, as shown. Generally, the base will include two raised portions 21 and 22 extending upwardly from the bottom of the base in which holes 17 and 18 are formed to give depth to holes 17 and 18. In the embodiment shown, the bottom surface under raised portions 21 and 22 is recessed, FIGS. 3, 5, and 6, and does not contribute to the spreading of weight on the roof. However, the plastic plugs 23, FIG. 3, in which the holes 17 and 18 are actually molded, are supported and stabilized by flanges 24 extending between plugs 23 and the walls of raised portions 21 and 22. The flanges transfer the weight from the studs to the base through the walls of raised portions 21 and 22 so it is distributed on the broad bottom surface 16 of the base. The material and structure forming the receiving holes for the base have to be strong enough to support the studs and withstand any expected forces applied to the studs so the studs are held securely and do not break out of the base.

Roller shaft 25, FIGS. 1, 4, and 7, has opposite end holes 26, FIG. 7, which slidably receive studs 19 and 20 therethrough. Lower nuts 28 are threaded onto studs 19 and 20 and have lower shaft supporting and conforming washers 29 positioned between nuts 28 and shaft 25. Nuts 28 are rotated to move them up or down on studs 19 and 20 to adjust the position of shaft 25. Upper nuts 30 and upper supporting and conforming washers 31 are provided to lock the shaft in position, if desired.

Roller 32 is rotatably positioned on shaft 25, and can support a pipe, conduit, or similar item thereon when the device is placed on a roof top. For purposes of this description, pipe, conduit, and similar items to be supported are all referred to as pipe. Nuts 28 and 30 are adjusted to adjust the height of roller 32 above base 15 and thereby to adjust the weight supported by roller 32 and the supporting device on the roof. Generally the height of roller 32 will be adjusted to equalize the weight supported between a plurality of the supporting devices which will generally be used to support a pipe on a roof.

Roller 32 may conveniently be formed of two roller halves 33 and 34. Each roller half is as shown in FIGS. 8–10 and on one end include tabs 35 and tab receiving recesses 36. Tabs 35 of one-half fit into tab receiving recesses 36 of the other half to align the two halves to form roller 32. Tabs 35 may frictionally fit into tab receiving recesses 36 to hold the two halves together and, in most cases, whether or not the tabs and recesses fit tightly, the two halves are glued or otherwise bonded together to ensure that the roller halves do not come apart when supporting a pipe. While roller 32 could be of constant diameter throughout its length, it is preferred that it be configured with a smaller diameter in the center (the ends of the halves that are joined) than at its outer ends, as shown. This provides better continuing alignment with a pipe supported by the roller. Washers 37 are positioned on shaft 25 between the ends of roller 32 and washers 29 and 31 to space the roller therefrom.

Each roller half is identical and the tabs 35 are spaced one hundred and eighty degrees apart. The tabs fit into receiving recesses 36 by rotating one-half relative to the other by ninety degrees so the tabs of one-half fit into the receiving recesses of the other half. Other arrangements of tabs and recesses could be used. The halves are each molded to be substantially hollow with a center wall 33a forming a cylindrical shaft receiving opening and an outer wall 33b forming the pipe supporting surface. Webs 33c join with wall 33b to form the rigid pipe supporting roller half.

Rather than shaft 25 with roller 32 thereon extending between studs 19 and 20, other pipe supports could be used and be adjustably mounted on studs 19 and 20. Thus, a strut 38, FIGS. 11 and 12, can be mounted similarly to roller shaft 25 and standard pipe clamps 39 as used with such struts can be secured in usual manner to strut 38. When using a strut such as 38, washers 29 and 31 will be flat washers rather than conforming washers which are radiused to conform to and support shaft 25. Struts 38 and clamps 39 are particularly useful to support electrical conduit such as 40 shown in broken lines.

In many instances, it is not necessary to have an adjustable height roller or to support the pipe other than relatively close to the roof. Merely a roller supported on the roof is sufficient. For such purposes, base 15 includes recesses 45 in facing raised portions 21 and 22, best seen in FIGS. 5 and 6, to accept the ends of lower roller shaft 46. Recesses 45 may be radiused to match shaft 46 or may merely be rectangular as shown in FIG. 6 to receive and support the ends of shaft 46. A retaining strap 47 may be positioned over shaft 46 and secured to base 15 screws 48. Strap 47 holds shaft 46 in recesses 45. A roller 49 made of roller halves 50 and 51, similar to roller halves 33 and 34, is rotatably mounted on shaft 46. Washers 52 are positioned on shaft 46 at the ends of roller 49 between it and raised portions 21 and 22 of the base 15 to space roller 49 from the sides of the raised portion. A pipe 55 can be supported by the device on roller 49, as shown in broken lines in FIGS. 1 and 4.

While generally either adjustable roller 32 or fixed roller 49 will be used, and both will not generally be used together, both are shown in the drawings for ease of illustration. However, both can be used together where two levels of pipe, one above the other, are to be supported. Fixed roller 49 will support a pipe relatively close to the roof, in the device illustrated at about two inches above the roof, although the raised portions 21 and 22 could be configured to be somewhat higher, if desired. Where an uneven roof is present so different supporting heights are needed at different support locations, or where it is necessary, such as to meet code, or desirable to support a pipe at a greater height above the roof, for example, six inches above the roof, the adjustable roller supported at a greater distance from the base by studs 19 and 20, is used. If greater height, such as a foot, is desirable, longer studs 19 and 20 can be used.

It is preferred that the parametral edges 60 of the base 15, see particularly FIGS. 5 and 6, are turned upwardly in a rounded edge to allow the base to slide on a roof without getting stuck or damaging the roof. The specific configurations and shapes of the edges and of the raised portions 21 and 22 can vary considerably in performing their function of providing a turned up edge and providing space and support for plastic plugs 23 and for lower nonadjustable roller shaft 46.

While the illustrated embodiment of the device includes a pair of raised portions, a single raised portion could be configured to include both stud receiving holes and a receiving cradle for a nonadjustable roller.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

What is claimed is:

1. A roof top pipe support comprising:
 a molded plastic base, said base having:
  a substantially flat bottom surface for resting on a roof; and
  a pair of raised portions providing a pair of receiving holes, one in each raised portion, for receiving studs therein and directing said studs upwardly from the base, and
  a pair of shaft receiving recesses, one in each raised portion, for receiving opposite end portions of a pipe supporting roller shaft; and
 a pipe supporting means for supporting a pipe above the roof.

2. A roof top pipe support according to claim 1, additionally including a pipe supporting roller shaft having opposite end portions, and wherein the pipe supporting means is a pipe supporting roller mounted on the pipe supporting roller shaft.

3. A roof top pipe support according to claim 2, wherein the end portions of the pipe supporting roller shaft are received in the shaft receiving recesses and the pipe supporting roller shaft extends between the pair of raised portions.

4. A roof top pipe support according to claim 1, additionally including a pair of studs extending upwardly from the pair of holes for receiving respective studs of the pair of studs therein, and the pipe supporting means extends between the studs above the pair of raised portions of the base.

5. A roof top pipe support according to claim 4, wherein the pipe supporting means is a pipe supporting roller positioned between the studs.

6. A roof top pipe support according to claim 5, wherein the pipe supporting roller is mounted on a pipe supporting roller shaft which extends between the studs.

7. A roof top pipe support according to claim 6, wherein the pipe supporting roller shaft includes holes therethrough, one at each of said opposite end portions thereof through which the studs pass respectively, and including means for adjustably securing said opposite end portions at desired locations along the studs.

8. A roof top pipe support according to claim 7, wherein the studs are threaded and the means for adjustably securing the opposite end portions at desired locations along respective studs are nuts threaded onto the studs.

9. A roof top pipe support according to claim 5, wherein the pipe supporting roller is formed of two molded roller halves secured together.

10. A roof top pipe support according to claim 4, wherein the pipe supporting means is a pipe supporting strut having opposite strut end portions and with a pipe clamp secured thereto.

11. A roof top pipe support according to claim 10, wherein the pipe supporting strut includes holes therethrough, one at each of said opposite strut end portions thereof, through which the studs pass respectively, and including means for adjustably securing said opposite strut end portions at desired locations along the studs.

12. A roof top pipe support according to claim 11, wherein the studs are threaded and the means for adjustably securing said opposite strut end portions at desired locations along the studs are nuts threaded onto the studs.

13. A roof top pipe support according to claim 1, wherein the pipe supporting means is a pipe supporting roller and the pipe supporting roller is formed of two molded roller halves secured together.

14. A roof top pipe support according to claim 1, additionally including a pair of studs extending upwardly from the pair of receiving holes for receiving studs therein, and the pipe supporting means extends between the studs above the pair of raised portions of the base.

15. A roof top pipe support according to claim 14, wherein the pipe supporting means is a pipe supporting roller positioned between the studs.

16. A roof top pipe support according to claim 1, wherein the pipe supporting means is a pipe supporting strut having opposite strut end portions and with a pipe clamp secured thereto.

17. A roof top pipe support according to claim 16, wherein the pipe supporting strut includes holes therethrough at opposite end portions thereof through which the studs pass respectively, and including means for adjustably securing said opposite strut end portions at desired locations along the studs.

* * * * *